March 28, 1944.   J. F. JORDAN   2,345,052
SCOOTER
Filed Jan. 8, 1942
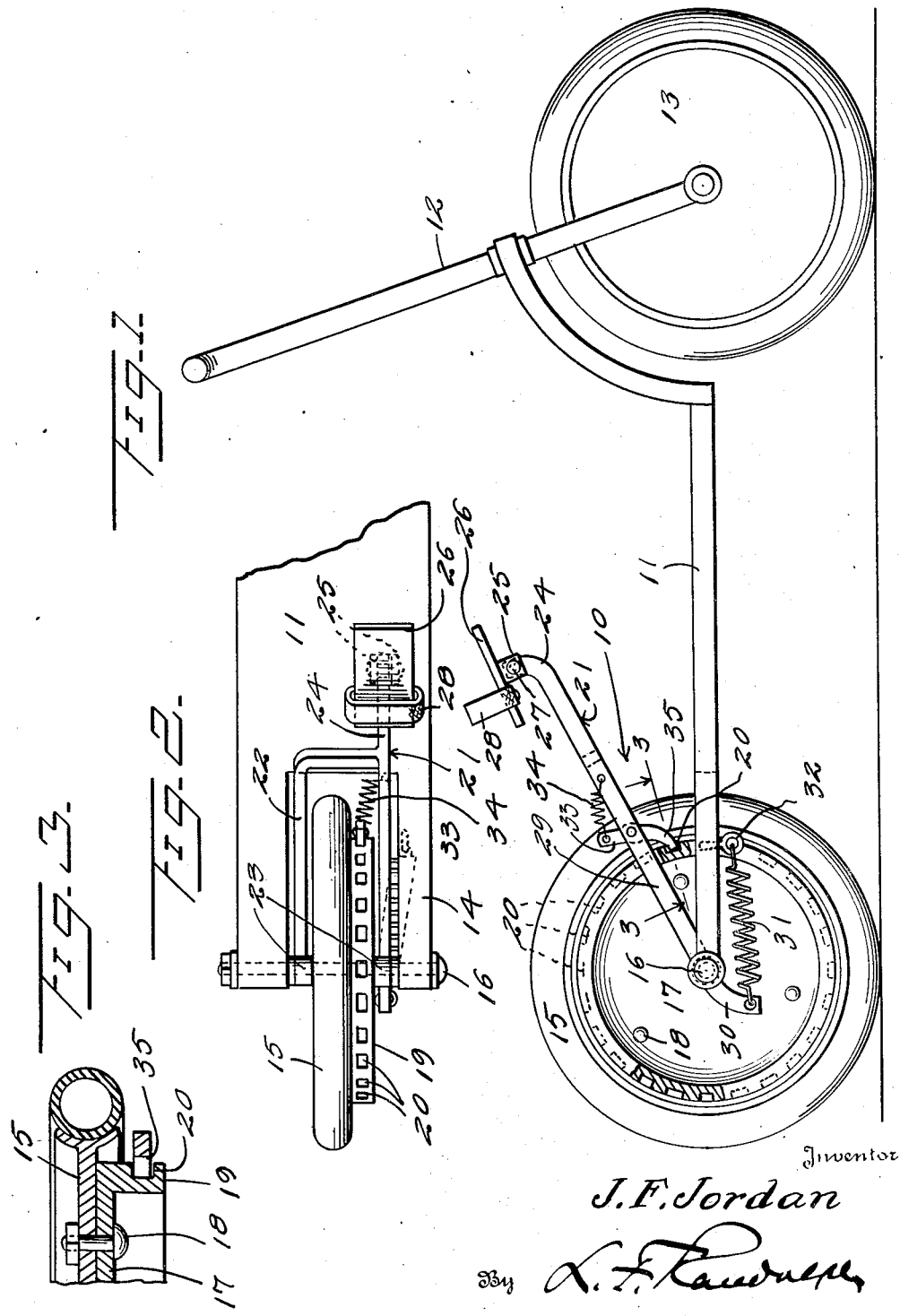
Inventor
J. F. Jordan
By L. F. Randolph
Attorney Patented Mar. 28, 1944

2,345,052

UNITED STATES PATENT OFFICE 2,345,052

SCOOTER

Joseph F. Jordan, Hot Springs National Park, Ark.

Application January 8, 1942, Serial No. 426,077

1 Claim. (Cl. 280—254)

This invention relates to an improved construction of a scooter and more particularly to a scooter capable of being propelled in a conventional manner by the rider pushing on the ground with one foot, or which can be propelled by the operation of a lever, forming a part of a pawl and rack power transmission means, with one foot while the rider stands on the platform of the scooter with his other foot.

Another object of the invention is to provide a power transmission means of the above described type of very simple construction capable of being readily applied to conventional types of scooters including those already in use and which when utilized will avoid the excessive wear caused to the shoes by pushing the scooter.

Other objects and advantages of the invention will hereinafter become more fully apparent from the following description of the drawing, which illustrates a preferred embodiment thereof, and wherein:

Figure 1 is a side elevational view of a scooter constructed in accordance with the invention, Figure 2 is a fragmentary top plan view of the same, and Figure 3 is a sectional view taken substantially along the plane of the line 3—3 of Figure 1.

Referring more particularly to the drawing, wherein like reference characters designate like or corresponding parts throughout the different views, 10 designates generally the improved scooter comprising the invention. The forward part of the scooter 10 including the platform 11, steering post 12 and front wheel 13 are of conventional construction. Platform 11 is provided with a bifurcated rear end 14, as seen in Figure 2, into which extends the rear wheel 15 which is journaled on a rear axle 16 which extends through the free ends of the furcations of the bifurcated portion 14.

A disk 17 is connected to one side of the wheel 15 by a plurality of nut and bolt fastenings 18 and is provided with a central opening, not shown, through which the axle 16 loosely extends. The disk 17, at its periphery, is provided with an annular flange 19 which projects away from the wheel 15 and which is provided with circumferentially spaced outwardly opening recesses 20.

A lever 21 is provided with a forked end 22 into which the wheel 15 extends. The legs of the fork 22 are provided with bearings 23 which turnably engage the axle 16 between the wheel 15 and the furcations of the bifurcated portion 14. The lever 21 extends forwardly from the axle 16 and has a forward end 24 which is offset laterally relatively to the center of the fork 22 to position the end 24 adjacent to one side edge of the platform 11. The terminal of the end 24 extends upwardly to receive depending lugs 25 of a foot pedal 26. Pedal 26 is fastened to the end 24 by a fastening 27 that extends through the lugs 25 and through the terminal of the end 24 for mounting the pedal 26 thereabove. Pedal 26 is preferably provided with a toe retaining strap or loop 28. The leg 29 of the fork 22 which is disposed adjacent to the flange 19, is provided with an extension 30 beyond its bearings 23 which is curved downwardly. A contractile coil spring 31 is connected at one end to the free end of the extension 30 and is anchored at its opposite end to an eye fastening 32 which projects downwardly from the platform 11 so that the end 24 of the lever 21 will be urged to a raised position by the spring 31.

A pawl or dog 33 is pivotally mounted, intermediate of its ends, on the inner side of the leg 29. A contractile spring 34 is connected at one end to the upper end of the pawl 33 and is anchored at its opposite end to the lever 21, between the pawl 33 and the lever end 24 for urging the opposite end 35, of the pawl 33, rearwardly. Said end 35 is curved rearwardly and is disposed so that when it is actuated by the spring 34 it will be moved toward the flange 19 and into engagement with one of the recesses 20. It will thus be seen that the flange 19, with its recesses 20, forms an annular rack.

As shown in Figure 2, the pedal 26 is disposed above the righthand side of the platform 11 so that the rider can stand with his left foot resting on the platform 11 and with the right foot resting on the pedal 26. By pressing downwardly on the pedal 26 the forward end of the lever 21 will be swung downwardly and if the pawl end 35 is not in engagement with a recess 20 it will be moved thereby into engagement with one of the recesses 20 and thereby revolve the rack and the rear wheel 15 for propelling the scooter 10 in a forward direction. This will also tension the spring 31 so that when the lever 21 has been swung downwardly and the pressure of the foot thereon is then removed, the spring 31 will cause the lever to swing upwardly. While the lever 21 is moving upwardly, the spring 34 will yield to allow the pawl end 35 to ride over the notches of recesses 20 so that said lever will turn relatively to the rack to resume a position from which it can again be depressed for propelling the scooter.

Various modifications and changes are contemplated and may obviously be resorted to, provided they fall within the spirit and scope of the invention as hereinafter defined by the appended claim, as only a preferred embodiment thereof has been disclosed.

I claim as my invention:

A scooter comprising a platform, a wheel mounted thereon at the front end thereof, said platform having a bifurcation at its rear end, an axle means extending across said bifurcation and mounted on the platform, a rear wheel accommodated in the bifurcation and journaled on said axle means, a relatively large disc fastened to one side of the rear wheel having a marginal flange extending laterally away from said rear wheel provided with peripheral recesses, an operating lever having a forked end providing portions on opposite sides of the rear wheel in the bifurcation and journaled on said axle means, spring means connected to the platform and to the lever below its axis to maintain the forward end of the lever elevated, a pawl carried by the lever and engageable with said recesses through depression of the lever to rotate the rear wheel, an extension on said lever, and a pedal, connected to said extension.

JOSEPH F. JORDAN.